(12) United States Patent
Alcock et al.

(10) Patent No.: US 11,037,571 B2
(45) Date of Patent: Jun. 15, 2021

(54) SPEECH-BASED TWO-WAY RADIO ASSISTANT

(71) Applicant: MOTOROLA SOLUTIONS, INC., Chicago, IL (US)

(72) Inventors: Nicholas John Alcock, Vancouver (CA); Justin Alexander Byfield, Vancouver (CA); Kurt Russell Grossnickle, Jensen Beach, FL (US); Liam Alexander Scholte, North Vancouver (CA); Zachary Aaron Weingarten, Parkland, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 133 days.

(21) Appl. No.: 16/593,496

(22) Filed: Oct. 4, 2019

(65) Prior Publication Data
US 2021/0104247 A1  Apr. 8, 2021

(51) Int. Cl.
| | |
|---|---|
| *G10L 21/00* | (2013.01) |
| *G10L 25/00* | (2013.01) |
| *G10L 15/00* | (2013.01) |
| *G10L 15/06* | (2013.01) |
| *G10L 15/18* | (2013.01) |
| *G10L 17/00* | (2013.01) |
| *G06K 9/00* | (2006.01) |
| *G06F 16/25* | (2019.01) |
| *H04W 4/02* | (2018.01) |
| *H04W 4/06* | (2009.01) |
| *G10L 25/78* | (2013.01) |
| *G10L 13/00* | (2006.01) |

(52) U.S. Cl.
CPC ............ *G10L 17/00* (2013.01); *G06F 16/252* (2019.01); *G06K 9/00744* (2013.01); *G10L 13/00* (2013.01); *G10L 25/78* (2013.01); *H04W 4/023* (2013.01); *H04W 4/06* (2013.01)

(58) Field of Classification Search
CPC ... G06F 16/252; G06K 9/00744; G10L 13/00; G10L 17/00; G10L 25/78; H04W 4/023; H04W 4/06
USPC ....... 704/200, 220, 231, 235, 246, 257, 258, 704/273, 274
See application file for complete search history.

(56) References Cited

U.S. PATENT DOCUMENTS

| | | | |
|---|---|---|---|
| 6,400,265 B1 * | 6/2002 | Saylor | G08B 13/19602 340/506 |
| 6,556,970 B1 * | 4/2003 | Sasaki | G01C 21/3608 382/100 |
| 7,343,171 B2 | 3/2008 | Saeed et al. | |
| 7,505,907 B2 * | 3/2009 | Carro | G06F 16/9558 704/270.1 |

(Continued)

FOREIGN PATENT DOCUMENTS

| | | |
|---|---|---|
| CN | 107103573 A | 8/2017 |
| WO | 2018/023339 A1 | 2/2018 |

*Primary Examiner* — Khai N. Nguyen

(57) ABSTRACT

Techniques for notification are presented. The techniques may include detecting a natural language phrase concerning an event at a geographic location in speech broadcast by a radio system, determining at least one search criteria from the natural language phrase, searching video surveillance data based on the at least one search criteria, such that search results are obtained, forming computer generated speech corresponding to the search results, and delivering the computer generated speech audibly.

18 Claims, 3 Drawing Sheets

(56) References Cited

U.S. PATENT DOCUMENTS

| | | | |
|---|---|---|---|
| 7,868,912 B2 | 1/2011 | Venetianer et al. | |
| 8,140,335 B2* | 3/2012 | Kennewick | G10L 15/19 |
| | | | 704/257 |
| 8,332,224 B2* | 12/2012 | Di Cristo | G10L 15/08 |
| | | | 704/257 |
| 8,781,826 B2* | 7/2014 | Kooiman | G10L 15/20 |
| | | | 704/233 |
| 8,862,173 B2 | 10/2014 | Marocchi et al. | |
| 9,389,083 B1 | 7/2016 | Agulnik et al. | |
| 9,898,250 B1* | 2/2018 | Williams | G06F 3/165 |
| 10,051,442 B2 | 8/2018 | Proctor | |
| 10,264,412 B2 | 4/2019 | Bohlander et al. | |
| 10,803,859 B1* | 10/2020 | Williams | G10L 17/22 |
| 2003/0028536 A1 | 2/2003 | Singh et al. | |
| 2007/0033005 A1* | 2/2007 | Cristo | G10L 15/19 |
| | | | 704/9 |
| 2014/0038668 A1 | 2/2014 | Vasavada et al. | |
| 2014/0136013 A1* | 5/2014 | Wolverton | B60K 35/00 |
| | | | 701/1 |
| 2014/0136187 A1* | 5/2014 | Wolverton | G10L 15/22 |
| | | | 704/9 |
| 2014/0368601 A1* | 12/2014 | deCharms | H04L 67/26 |
| | | | 348/14.02 |
| 2016/0165191 A1 | 6/2016 | Rasheed et al. | |
| 2016/0203817 A1 | 7/2016 | Formhals et al. | |
| 2016/0247383 A1* | 8/2016 | Kassab | H04N 21/814 |
| 2019/0069153 A1* | 2/2019 | Gideon, III | G06F 3/0482 |
| 2019/0171740 A1 | 6/2019 | Sabripour et al. | |
| 2019/0286901 A1 | 9/2019 | Blanco et al. | |
| 2019/0294631 A1 | 9/2019 | Alcantara et al. | |
| 2020/0192684 A1* | 6/2020 | Woo | G06F 9/451 |
| 2021/0064624 A1* | 3/2021 | Carbune | G06F 16/953 |
| 2021/0104247 A1* | 4/2021 | Alcock | G10L 25/78 |

* cited by examiner

SPEECH-BASED TWO-WAY RADIO ASSISTANT

FIELD

This disclosure relates to two-way radio systems, such as police dispatch systems.

BACKGROUND

Two-way radio systems can be implemented using a variety of technologies. For example, two-way radio systems may be analog or digital. Example analog two-way radio systems include citizen's band (CB) radio systems, and example digital two-way radio systems include radio-over-IP (i.e., radio over internet protocol). Two-way radio systems may have a typical range (without repeaters) of about five miles. Both analog and digital systems may be used to send messages to a subset of individuals within a broadcast range, for example, using a Continuous Tone-Coded Squelch System (CTCSS), a Digital Code Squelch (DCS), a trunked radio system, or IP packet addressing.

Two-way radio systems are frequently used for police, fire department, emergency medical technician, ambulance, and other first-responder dispatch. Police dispatch systems, for example, may include a base station, which may be geographically fixed and staffed by a police dispatcher. Further, such dispatch systems may include a plurality of mobile radios for use by first responders in the field. Such mobile radios may be fixed in a vehicle or may be hand-held and capable of being carried on one's person, for example, in a holster attached to a utility belt.

SUMMARY

According to various embodiments, a computer-implemented method of notification is presented. The method includes: detecting a natural language phrase concerning an event at a geographic location in speech broadcast by a radio system; determining at least one search criteria from the natural language phrase; searching video surveillance data based on the at least one search criteria, such that search results are obtained; forming computer generated speech corresponding to the search results; and delivering the computer generated speech audibly.

Various optional features of the above embodiments include the following. The at least one search criteria may include an identification of the geographic location, where the searching includes: identifying, based on the identification of the geographic location, at least one video camera proximate to the geographic location; and searching video surveillance data from the at least one video camera proximate to the geographical location. The delivering may include broadcasting the computer generated speech through the radio system. The delivering may include: waiting for a period of audio inactivity on the radio system; and commencing broadcasting the computer generated speech through the radio system during the period of audio inactivity. The delivering may include detecting at least one specific responder near to the geographic location; and delivering the computer generated speech audibly to the at least one specific responder. The delivering may include delivering of the computer generated speech audibly to the at least one specific responder via a mobile phone of the at least one responder. The at least one search criteria may include at least one of a physical description of a person or a physical description of a vehicle. The determining the at least one search criteria from the natural language phrase may include matching a police code in the natural language phrase to a description of the event, where the computer generated speech includes the description of the event. The natural language phrase may include an identification of a specific individual, and the method may further include retrieving information regarding the specific individual from a law enforcement database based on the identification, where the computer generated speech includes at least some of the information regarding the individual. The determining the at least one search criteria from the natural language phrase may include: converting the speech for the natural language phrase to a first text string of words; applying a synonym mapper to the first text string of words to obtain a second text string of words; and parsing the second text string of words to obtain the at least one search criteria.

According to various embodiments, a system for notification is presented. The system includes: at least one electronic processor configured to receive a natural language phrase concerning an event at a geographic location detected in speech broadcast by a radio system; at least one electronic processor configured to determine at least one search criteria from the natural language phrase; at least one electronic processor configured to request a search of video surveillance data based on the at least one search criteria, such that search results are obtained; at least one electronic processor configured to obtain computer generated speech corresponding to the search results; and at least one electronic processor configured to deliver the computer generated speech audibly.

Various optional features of the above embodiments include the following. The at least one search criteria may include an identification of the geographic location, and the at least one electronic processor configured to request a search of video surveillance data may be further configured to: identify, based on the identification of the geographic location, at least one video camera proximate to the geographic location; and request a search of video surveillance data from the at least one video camera proximate to the geographical location. The at least one electronic processor configured to deliver the computer generated speech audibly may be further configured to broadcasting the computer generated speech through the radio system. The at least one electronic processor configured to deliver the computer generated speech audibly may be further configured to: wait for a period of audio inactivity on the radio system; and commence broadcasting the computer generated speech through the radio system during the period of audio inactivity. The at least one electronic processor configured to deliver the computer generated speech audibly may be further configured to: detect at least one specific responder near to the geographic location; and deliver the computer generated speech audibly to the at least one specific responder. The at least one electronic processor configured to deliver the computer generated speech audibly may be further configured to deliver of the computer generated speech audibly to the at least one specific responder via a mobile phone of the at least one responder. The at least one search criteria may include at least one of a physical description of a person or a physical description of a vehicle. The at least one electronic processor configured to determine at least one search criteria from the natural language phrase may be further configured to match a police code in the natural language phrase to a description of the event, where the computer generated speech includes the description of the event. The natural language phrase may include an identification of a specific individual, and the system may further include at least one electronic processor configured to retrieve information regarding the specific individual from a law enforcement database based on the identification, where the computer generated speech includes at least some of the information regarding the individual. The at least one electronic processor configured to determine at least one search criteria from the natural language phrase may be further configured to: convert the speech for the natural language phrase to a first text string of words; apply a synonym mapper to the first text string of words to obtain a second text string of words; and parse the second text string of words to obtain the at least one search criteria.

BRIEF DESCRIPTION OF THE DRAWINGS

The accompanying drawings, which are incorporated in and constitute a part of this specification, illustrate the present teachings and together with the description, serve to explain the principles of the disclosure.

Figure 1:
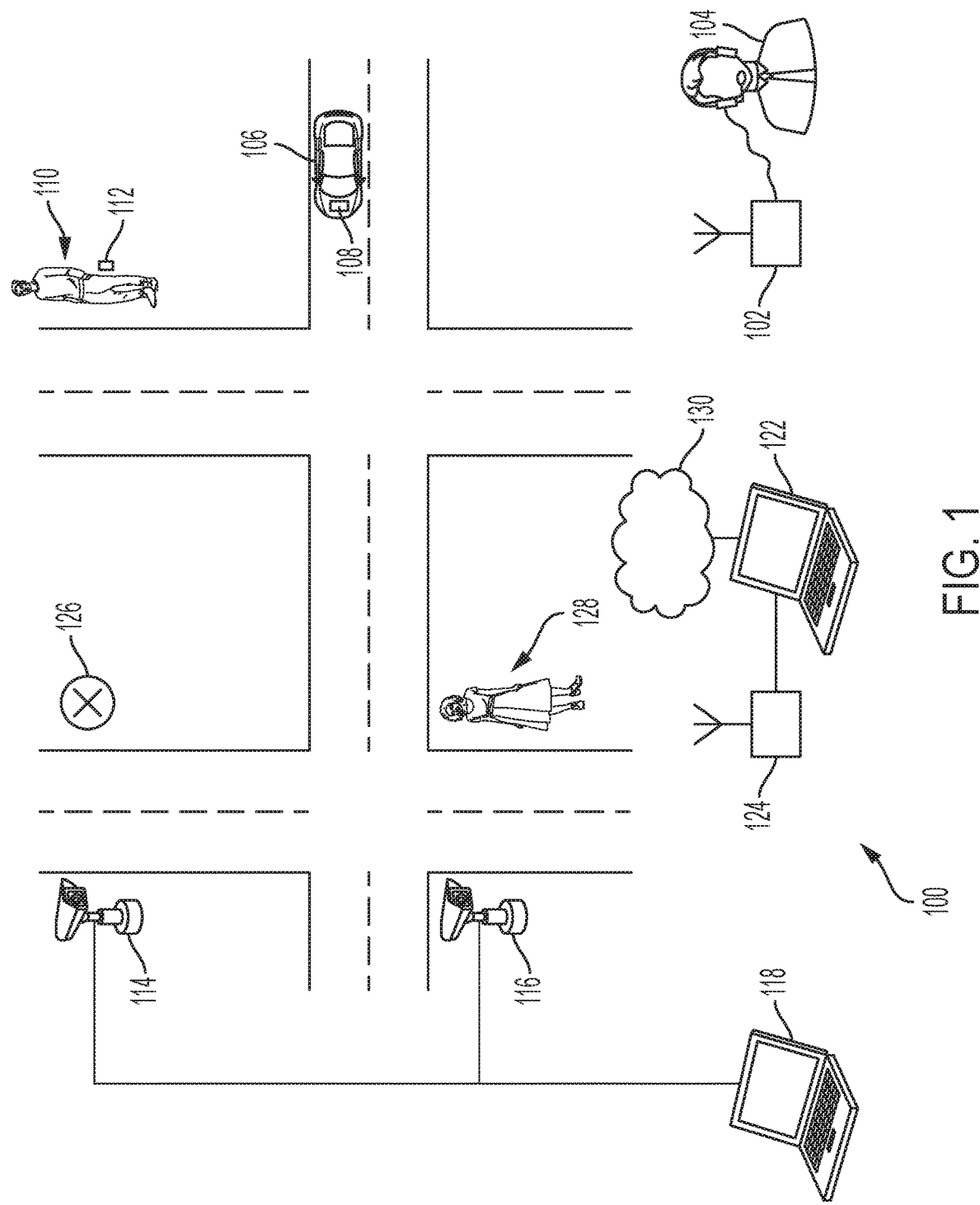
FIG. 1 is a schematic diagram of a system for speech-based assistance in a two-way radio system according to some embodiments.

It should be noted that some details of the figures have been simplified and are drawn to facilitate understanding of the present teachings, rather than to maintain strict structural accuracy, detail, and scale.

DETAILED DESCRIPTION

Reference will now be made in detail to the disclosed examples, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific examples. These examples are described in sufficient detail to enable those skilled in the art to practice them and it is to be understood that other examples may be utilized and that changes may be made without departing from the scope of the disclosure. The following description is, therefore, merely exemplary.

Some embodiments interface with an existing two-way radio dispatch system and interpret speech broadcast thereon to identify an event, such as a criminal act, and its location. Such embodiments may generate search criteria from the broadcast speech concerning the event, such as a suspect's physical description or a physical description of a vehicle, and use the search criteria to search video surveillance data. The search, which may include searching video surveillance metadata, may reveal search results corresponding to a suspect or vehicle, for example. The embodiments may then provide the search results to the first responders, for example by forming and delivering, over the dispatch system, computer generated speech identifying the search results for consumption by first responders.

Thus, some embodiments provide guidance to first responders as to where they should focus their efforts. For example, if a person matching a broadcasted suspect description was captured by a nearby surveillance camera and identified by an embodiment, the embodiment can automatically deliver computer-generated speech over a police dispatch system that directs an officer to a specific location associated with the surveillance camera, instead of a general area. In various implementations, the officer may be notified directly by the system itself, or through the dispatcher, who can vet the incoming potential suspect matches before notifying a field officer. In some implementations, by using the officer's geo-location, the alerts can be sent only to officers who are proximate to the location of interest. Because embodiments operate in realtime or near realtime, the chances of finding the correct suspect increase significantly.

Embodiments provide many new technical advantages. For example, some embodiments provide a novel bridge between computer-aided dispatch systems and city surveillance systems. Further, some embodiments operate in realtime, delivering targeted information to first responders faster than a human dispatcher could. Yet further, because some embodiments operate by processing speech that is already present on a dispatch system, first responders using the system do not require additional training or overhead or changes to their current operating procedures.

These and other advantages are set forth herein.

FIG. 1 is a schematic diagram of a system 100 for speech-based assistance in a two-way radio system according to some embodiments. FIG. 1 illustrates three main portions, described in detail below: a two-way radio dispatch system, a video surveillance system, and an automated speech-based dispatch assistant system.

The two-way radio dispatch system includes two-way radio base station 102, which may be staffed by dispatcher 104, vehicular mobile two-way radio 108, present on vehicle 106, and hand-held mobile two-way radio 112, carried by first responder 110. Base station 102 may be present at a police station, for example. Two-way radios 108, 112 may be analog, digital, or hybrid (for example, an analog system using digital coded squelch). In one example, the two-way radios are APX™ 8000 all-band P25 portable radios sold by Motorola Solutions™, each including one or more modules that enable generation and transmission of the radio's location out over the associated wireless network. The two-way radio dispatch system may be capable of broadcasting to all mobile two-way radios in the field, or a select subset. In general, the two-way radio dispatch system may be a typical police, first responder, or other dispatch system as known in the art.

The two-way radio dispatch system may implement a radio access network ("RAN"). RANs may operate according to an industry standard Land Mobile Radio ("LMR") or cellular protocol such as, for example, the Project 25 ("P25") standard defined by the Association of Public Safety Communications Officials International ("APCO"), the TETRA standard defined by the European Telecommunication Standards Institute ("ETSI"), the Digital Private Mobile Radio ("dPMR") standard also defined by the ETSI, the Digital Mobile Radio ("DMR") standard also defined by the ETSI, the Long Term Evolution ("LTE") (including LTE-Advanced or LTE-Advanced Pro compliant with, for example, the 3GPP TS 36 specification series), or the 5G (including a network architecture compliant with, for example, the 3GPP TS 23 specification series and a new radio ("NR") air interface compliant with the 3GPP TS 38 specification series) standard, among other possibilities, and over which multimedia broadcast multicast services ("MBMS"), single site point-to-multipoint ("SC-PTM") services, or Mission Critical Push-to-talk ("MCPTT") services may be provided, or over which an open mobile alliance ("OMA") push to talk ("PTT") over cellular ("OMA-PoC"), a voice over IP ("VoIP"), or a PTT over IP ("PoIP") application may be implemented.

In some embodiments, the mobile two-way radios, vehicular mobile two-way radio 108 and hand-held mobile two-way radio 112, may implement a direct-mode, conventional, or trunked land mobile radio ("LMR") standard or protocol such as ETSI Digital Mobile Radio ("DMR"), a Project 25 ("P25") standard defined by the Association of Public Safety Communications Officials International ("APCO"), Terrestrial Trunked Radio ("TETRA"), or other LMR radio protocols or standards. In other embodiments, the mobile device transmitter may implement a Long Term Evolution ("LTE") ("including LTE-Advanced or LTE-Advanced Pro compliant with, for example, the 3GPP TS 36 specification series") or 5G ("including a new radio ("NR") air interface compliant with the 3GPP TS 38 specification series") protocol, among other possibilities, over which multimedia broadcast multicast services ("MBMS"), single site point-to-multipoint ("SC-PTM") services, or Mission Critical Push-to-talk ("MCPTT") services may be provided, or over which an open mobile alliance ("OMA") push to talk ("PTT") over cellular ("OMA-PoC"), a voice over IP ("VoIP"), an LTE Direct or LTE Device to Device, or a PTT over IP ("PoIP") application may be implemented. Direct mode LTE standards may additionally or alternatively be implemented as well, including but not limited to the LTE Direct device-to-device standard.

As will be appreciated by those skilled in the art, conventional dispatch systems for police and other first-responders broadcast a variety of information-rich speech data that is underutilized by municipal surveillance systems. This data in the conventional system may goes unused, except perhaps for post-facto investigations and evaluations: not for any sort of automated real-time alerting.

In accordance with some example embodiments, edge recognition using keyword identifier is carried out in relation to the human speech inputted into the system 100 via the two-way radios. In one example, this is implemented using a library called Porcupine™, which actively listens at all times before sending the active phrase to be processed by speech recognition software running in the cloud, for instance. In one example, this speech recognition software is Google Cloud Speech™. Other examples include Microsoft's Cognitive Service and IBM's Watson. The cloud-based speech recognition software may be implemented in cloud-based system 130 and/or further coupled to video surveillance server 118.

Continuing on, the illustrated video surveillance system includes video surveillance cameras 114, 116, which may be pan-tilt-zoom cameras, for example, and video surveillance server 118. Video surveillance cameras 114, 116, may be disposed about a municipality, for example, on various city blocks as depicted in FIG. 1. Nevertheless, video surveillance cameras suitable for use in embodiments are not limited to cameras in fixed geographic locations, present on vehicles, or carried on a person's body. Suitable surveillance cameras include dome, multi-head, drone-based, etc. Further, the image sensors in suitable cameras may capture visible light, or radiation outside the visible spectrum such as infrared or ultraviolet. Night vision cameras may also be suitable.

Video surveillance cameras 114, 116, may be coupled to video surveillance server 118 by wireline as shown, wirelessly, or by using a combination of wireline and wireless connections. The video surveillance system may be automated, such that it may identify, generate, and/or store metadata concerning the images it captures. An example such video surveillance system is disclosed in U.S. Pat. No. 7,868,912 entitled "Video Surveillance System Employing Video Primitives". The video surveillance system metadata may include identifying information for people (for example, height, build, estimated age, clothing type and color, speed and direction, etc.) and/or vehicles (color, type, make, model, year, license plate, speed and direction, etc.), among other things. The metadata may further include location information, such as a location of the respective camera and/or a location of its field of view, the latter of which may be adjusted in real time as cameras 114, 116 pan, tilt, and/or zoom. The location information may be in the form of geographic coordinates, for example, in one or more latitude and longitude pairs. The metadata may be stored in video surveillance server 118 in association with its respective images.

Server 118 may be accessible via the internet by a client computer, for example, that provides appropriate authorization credentials, such as a user name and password. In particular, server 118 may receive search criteria, such as a description of a person's or vehicle's visual appearance and/or physical trait(s) and/or location and/or time of day, and send back corresponding video surveillance data, such as images, video, and/or metadata. The search criteria may be in the form of text, such as formatted descriptive words (for example, sex: male, shirt: red, pants: blue, hair color: brown, etc.), or in the form of natural language (for example, male with a red shirt and blue pants and brown hair) according to various embodiments. In various embodiments, the server 118 may identify or determine the video surveillance data that corresponds to the search criteria based on the word(s) of the search criteria matching or being closely related to words in the metadata that describes an image or a video segment of the video surveillance data. In one example, the server may be a Dell™ Power Edge R730™ rack server running ACC™ with Avigilon Appearance Search™ sold by Avigilon™. Other suitable systems include license plate recognition systems and facial recognition systems.

The automated speech-based dispatch assistant system includes two-way radio base station 124 and dispatch assistant computer 122, which may be in communication with cloud-based system 130. According to various embodiments, base station 124 and computer 122 may be separate, may be implemented as communicatively coupled hardware, or may be integrated into the same physical unit. Base station 124 may be a typical two-way radio base station that is configured to be controlled by dispatch assistant computer 122. In particular, dispatch assistant computer 122 may receive and process human speech broadcast on the two-way radio system via base station 124, and may form and deliver computer-generated speech on the two-way radio system via base station 124. Two-way radio base station 124 and computer 122 are configured, in concert with the two-way radio dispatch system and the video surveillance system, to perform the methods, operations, and/or functions disclosed herein.

Cloud system 130 may implement a variety of could-based services as disclosed herein. For example, according to an embodiment, cloud-based system 130 uses a virtual private server running a node.js web server that serves an HTML dashboard and a rest API for a connection to a mangoDB database, which may store geographic or other information.

Figure 2:
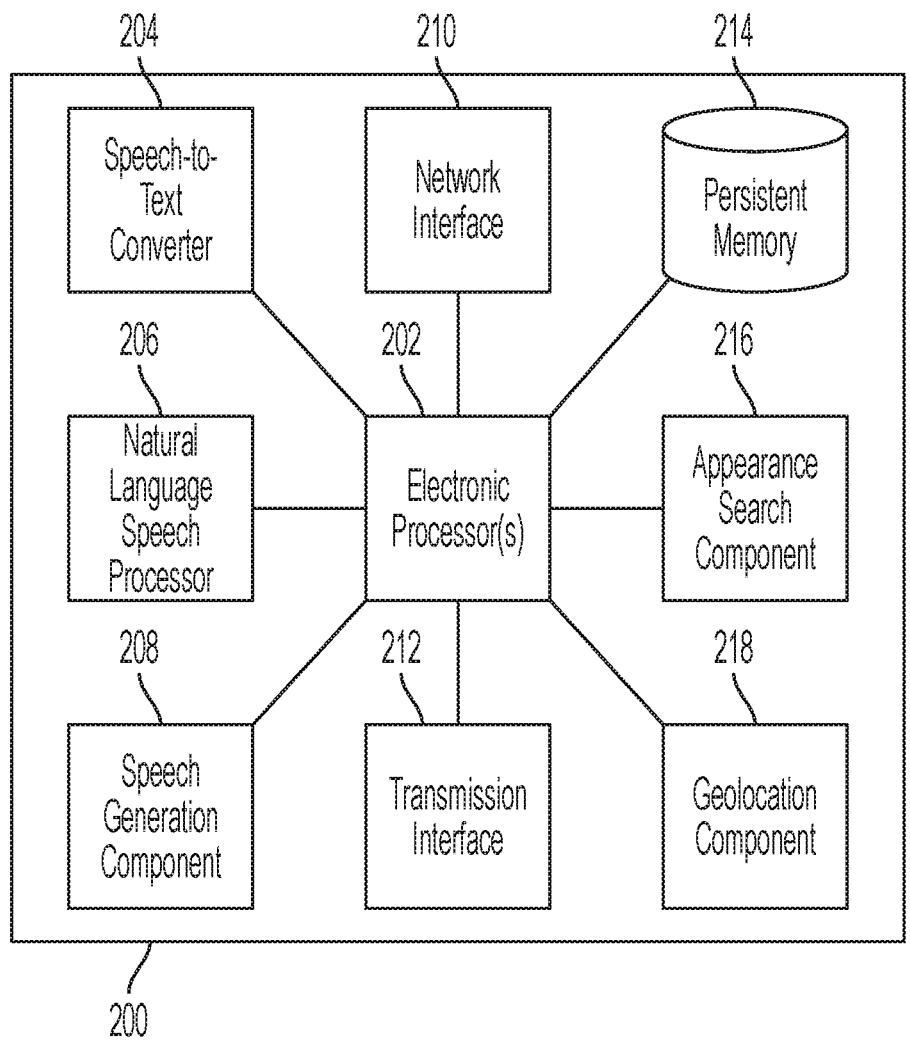
FIG. 2 is a schematic diagram of a speech-based assistant computer according to some embodiments.

A description of an example usage of the automated speech-based dispatch assistant system as shown and described in reference to FIG. 1 is presented following the detailed description of dispatch assistant computer 122 according to FIG. 2, presented immediately below.

FIG. 2 is a schematic diagram of dispatch assistant computer 200 according to some embodiments. Dispatch assistant computer 200 may be an embodiment of dispatch assistant computer 122 of FIG. 1. As shown, dispatch assistant computer 200 includes one or more electronic processors 202 communicatively coupled to persistent memory 214 and to transmission interface 212. According to some embodiments, processors 202 may be configured by instructions stored in persistent memory 214 to perform the methods disclosed herein in concert with other components of dispatch assistant computer 200 and system 100 for speech-based assistance in a two-way radio system as detailed herein.

Dispatch assistant computer 200 also includes a number of components 204, 206, 208, 210, 212, 216, 218, which each perform particular functions. The components may be implemented as hardware, firmware, software executing on, for example, processors 202, a dedicated hardware computer, or as any combination of the aforementioned.

Although components 204, 206, 208, 210, 212, 216, 218 are depicted as being included in speech-based assistant computer, one or more may be implemented in separate hardware, for example, as internet-connected services. Thus, dispatch assistant computer 200 is shown as including network interface 210, for accessing internet-accessible services that perform the functions of any of components 204, 206, 208, 216, 218 as described herein.

Transmission interface 212 is communicatively coupled to, and may control transmission and reception of, two-way radio base station 124. For example, transmission interface 212 can control base station 124 to deliver computer-generated speech over the two-way radio dispatch system, either broadcast, or sent to a targeted subset of mobile two-way radios in the field, i.e., sent only to specified mobile two-way radios. Further, transmission interface 212 can receive speech delivered over the two-way radio dispatch system (for example, from the dispatcher 104 and/or the first responder 110) and provide digitized audio to processors 202, speech-to-text converter 204, or network interface 212.

According to some embodiments, transmission interface 212 and/or processors 202 are configured to deliver the computer-generated speech only at appropriate times. More particularly, according to some embodiments, when dispatch assistant computer 200 determines that computer-generated speech is to be delivered over the two-way radio dispatch system, transmission interface 212 initializes to wait for a period of silence on the airwaves before issuing the pending computer-generated audio. The period of silence may be fixed or adjustable by an administrator through dispatch assistant computer 200. According to various embodiments, the duration of the period of silence may be set to any time from about one-half of a second to about ten seconds, such as 0.5 second, 0.75 second, or 1.0 second. Once implemented, when dispatch computer 200 determines that computer-generated speech is to be delivered over the two-way radio dispatch system, transmission interface 212 proceeds to capture audio present on the communication channel. Once the energy of the audio drops below a threshold to indicate that no intentional sounds are present, a timer for the period of silence begins. If the timer concludes without audio being broadcast over the channel, then the pending audio is delivered via transmission interface 212. According to some embodiments, if audio appears in the midst of the computer-generated speech being delivered, the computer-generated speech halts and the radio base station 124 ceases transmitting, and the system again waits for the period of silence before delivering the computer-generated speech.

Speech-to-text converter 204 converts digitized audio of human speech to text using known techniques, such as those based on hidden Markov models or neural networks. According to some implementations, speech-to-text converter 204 is trained using a training corpus of digitized audio speech data labeled with its corresponding text. Speech-to-text converter 204 in particular may be implemented as a web service.

Natural language speech processor 206 accepts text of natural language and, using known techniques, extracts meaning therefrom, for example, in the form of one or more of: a physical description of a person, a physical description of a vehicle, an event description, or a location. Natural language speech processor 206 may thus include one or more neural networks according to some embodiments, for example, one or more neural networks trained to identify a physical description of a person from text, one or more neural networks trained to identify a physical description of a vehicle from text, one or more neural networks trained to identify an event from text, and/or one or more neural networks trained to identify a location from text. Each neural network may have been trained by a training corpus that includes raw text strings paired with assigned meanings.

To extract a physical description of a person from text, for example, natural language speech processor 206 may include a neural network trained using pairs of text and corresponding features and descriptions. Such a neural network may thus provide a physical or visual description of the person in the form of features and descriptions thereof. For example, "adult female all black clothing with black sunglasses at 4 pm today" may be converted into the following formatted form: {(age: adult), (gender: female), (full_body: black), (accessory: sunglasses, black), (start_datetime: 4 pm, today)} by such a neural network.

To process a physical or visual description of a vehicle, natural language speech processor 206 may include a neural network similar to that used to process a physical description of a person, except instead of using physical descriptions of people, it may be trained according to physical descriptions of vehicles.

To process an event, natural language speech processor 206 may include a neural network trained using ordered pairs relating textual speech elements to event descriptions. Accordingly, the training data may include pairs such as (10-12, vandalism), (report of an armed robbery, armed robbery), (shots fired, shots fired), (can we get an ambulance over here, ambulance requested), etc. Applying such a trained convolution neural network to a full string may produce an event description corresponding to the natural language text, for example, "vandalism".

According to some embodiments, in addition or in the alternative to using a neural network, to process an event, natural language speech processor 206 may include a lookup table for police codes for the particular jurisdiction in which system 100 is implemented. Such a table may associate numeric police codes with corresponding event descriptions. For example, such a table may include the following entries, relevant to Norfolk, Va.: (10-12, vandalism), (10-25 prowler), (10-45, fight), etc.

To process a location, natural language speech processor 206 may include a neural network trained using ordered pairs relating textual speech elements to locations. Such a neural network may accept a text string such as "all units, shots fired at 123 Main Street" and output "123 Main Street".

According to some embodiments, natural language speech processor includes a synonym mapper, which substitutes synonyms for words in the provided strings of text. Such a synonym mapper may be useful for assigning meanings to strings of text that are unrecognized by the trained neural network. For example, if a string is unrecognized, or recognized with a low confidence, then a string with one or more substituted synonyms may be provided to natural language speech processor 206 instead.

Speech generation component 208 converts text to audible speech using known techniques. For example, speech generation component may include a speech synthesizer and/or a table of recorded speech snippets paired with text stored in a database. The speech may be generated by concatenating snippets of recorded speech that correspond to the supplied text.

Appearance search component 216 (for example, client-side software for Avigilon Appearance Search™) can initiate searching of video surveillance data, such as video surveillance metadata, based on provided search terms and using known techniques. An example such system is disclosed in U.S. patent application Ser. No. 16/355,470, entitled, "Method and System for Interfacing with a User to Facilitate an Image Search for an Object-of-Interest", filed Mar. 15, 2019. Appearance search component 216 may interface with a video surveillance server, such as video surveillance server 118 as shown and described above in reference to FIG. 1, to provide search terms and receive search results.

Search terms may be in the form of features and corresponding descriptions, for example, {(age: adult), (gender: female), (full_body: black), (accessory: sunglasses, black), (start_datetime: 4 pm, today)}. The features and corresponding descriptions may be based on physical descriptions of a person, physical descriptions of a vehicle, or descriptions of any other object or entity captured and associated with metadata by the video surveillance system. Search terms may further include location information, indicating a region in which video surveillance data to be searched was captured. The location information may be specified as a point defined by a latitude and longitude and a radius about the point, for example.

The search results may include time and location information. More particularly, the search results may include location information for one or more video surveillance cameras that captured the identified images, for example, in the form of latitude and longitude for camera location or camera field of view, together with date and time information corresponding to the identified images. The search results may further include still images or video corresponding to the search criteria. Further, the search results may include a natural language description of the video corresponding to the search results, or a description in the form of pairs of features and descriptions thereof corresponding to the search criteria.

Geolocation component 218 may collect and store real-time information as to the locations of first responders using known techniques. According to some embodiments, one or more first responders carry on their person or in their vehicles GPS tracking devices, which identify their location in terms of latitude and longitude coordinates. Such GPS tracking devices may be part of an existing fleet management system according to some embodiments, conveying their geographic coordinates periodically (for example, every minute) to an application executing on a computer available to police dispatcher 104. The GPS tracking devices may utilize a cellular telephone network, for example, to transfer their information. According to some embodiments, the GPS tracking devices and/or the fleet management system are configured to provide realtime first responder location information to geolocation component 218. Geolocation component stores such information and makes it available to processes executing within dispatch assistant computer 200.

Returning to FIG. 1, in view of the information provided for FIG. 2, a description of an example usage of system 100 for speech-based assistance in a two-way radio system follows.

The usage may begin at the occurrence of an event 126. Event 126 may be any of a variety of events, such as a criminal act. Thus, event 126 may be a mugging, an assault, a fire, a person in medical distress, or a disturbance of the peace, by way of non-limiting examples. For purposes of illustration rather than limitation, according to the example usage, event 126 is an act of vandalism committed by an adult female wearing all black clothing and black sunglasses. Event 126 may or may not be captured by the video surveillance system. Nevertheless, a first responder such as a police officer or dispatcher 104 becomes aware of event 126, for example, by receiving a report from a bystander, or by directly viewing event 126.

Event 126 is verbally reported over the two-way radio system, for example, via base station 102 by dispatcher 104, who may have received a notification of event 126 from a bystander or officer. The verbal report may be broadcast to an entirety of first responders (in the present example, to two-way radios 108 and 112), or selectively sent to a specific one or more first responders (in the present example, to two-way radio 108 or 112). The report may include a description of an event and a description of a person or vehicle, such as a description of the visual or physical appearance or characteristics of a person or vehicle. The report may further include location information, specifying a geographic location at which the event occurred. Continuing the ongoing example, the event may be audibly reported as, "10-12, adult female wearing all back clothing and black sunglasses reported at 123 Main street." Base station 124 of the system 100 for speech-based assistance in a two-way radio system captures the report and conveys the audio to dispatch assistant computer 122.

Dispatch assistant computer 122, which may embody dispatch assistant computer 200, receives digitized audio comprising the report. It passes the digitized audio to speech-to-text converter 204, which produces text corresponding to the report. Continuing the example, such text may be "10-12, adult female wearing all back clothing and black sunglasses reported at 123 Main street". The text corresponding to the report is then passed to natural language speech processing component 208. Natural language speech processing component 208 parses the text corresponding to the report to obtain textual data including a physical description of a person or a vehicle, an event description, and a location. Continuing the ongoing example, such textual data may be of the form: {(location: 40.7580° N, 73.9855° W), (age: adult), (gender: female), (full_body: black), (accessory: sunglasses, black), (time: 4:00 pm, today)}

Next, dispatch assistant computer 122 produces, formats, or otherwise determines search criteria based on the textual data output by natural language speech processing component 208. According to some embodiments, the search criteria that is determined may not include location information, and the search may be of video surveillance data produced by the entire video surveillance system. That is, in such embodiments, the search may be unrestricted by camera location used to capture the search video surveillance data.

According to other embodiments, the search criteria may include location information, such that the search is restricted to video surveillance data captured by video cameras whose location or whose field of view is proximate to the location of the event. Here, whether a video camera or a field of view thereof is "proximate" to a location of an event may be determined by judging whether a person or vehicle, according to the search criteria, could traverse the distance between the event location and the camera location in a time interval defined in part by the time between the occurrence of the event and the time of the reporting of the event. The time interval may be padded to always include, for example, several minutes (for example, 1, 2, 3, 4, or 5 minutes), to account for delays between the occurrence of the event and first responders being alerted to the event. That is, according to some embodiments, the time interval is at least a fixed number of minutes long. If the time of the event is unknown, and only the time of the reporting of the event over the two-way radio dispatch system is known, then the time interval may be set to this fixed number of minutes. Standard rates of travel for people and vehicles, for example, 8 mph and 65 mph, respectively, may be used to determine the distance that a person or vehicle can traverse in the defined time interval. Further, predicative time of arrival techniques, such as those disclosed in US Pat. Publ. No. 2016/0165191 entitled, "Time-of-Approach Rule" may be used to determine and report a predicted future location of a person or vehicle. Appearance search component 216 thus searches video surveillance data from any cameras (or cameras with fields of view) within the distance a person or vehicle could travel from the location of the event during the specified time interval, that is, it searches video surveillance data proximate to the location of the event.

For example, if the search criteria specify a physical description of a person and that the event occurred at 4:00 pm, and that the report did not issue over the two-way radio dispatch system until 4:05 pm, then with a fixed three-minute padding, the time interval may be determined as eight minutes. Using a standard human running rate of 8 miles per hour, the person could have travelled 1.07 miles in that interval. Therefore, appearance search component 216 searches video surveillance data captured by any cameras that are located, or whose fields of view are located, within 1.07 miles of the location of the event.

Alternately, some embodiments use a fixed distance in determining whether a video camera or a field of view thereof is proximate to a location of an event. Such a fixed distance may be, for example one mile.

Appearance search component 216 thus accepts the search criteria, which may or may not include geographic location restrictions, passes them to appearance search component 126, and, obtains from appearance search component 126 search results, which may be in the form of a location indicator and an identification of the matching description of the person or vehicle, as the case may be. The location indicator may be information describing the location of the camera (for example, latitude and longitude coordinates), or the field of view thereof, that captured the image(s) corresponding to the search results. The identification of the matching physical description may be in the form of camera metadata that matches, at least partially, the search criteria, where the metadata is from or associated with the captured images. In various embodiments, the identification may be implemented as paired features and descriptions, or in the form of natural language, according to various embodiments.

Continuing the ongoing example, the search criteria may be determined and/or formatted as {(location: 40.7580° N, 73.9855° W, 1.07 mile radius), (age: adult), (gender: female), (full_body: black), (accessory: sunglasses, black), (start_datetime: 4:00 pm, today)}. The location specified in the search criteria corresponds to the location of event 126. Nevertheless, for the ongoing example, suspect 128 may have travelled to the next block within a few minutes of the event. Video surveillance camera 116, whose field of view may not intersect the location of event 126, captures video of suspect 128, which the video surveillance system stores at video surveillance server 118 together with relevant metadata describing the appearance of any people in the video images. Appearance search component 216 provides the search criteria to video surveillance server 118, which responds with at least partially matching search results from video collected by the video surveillance camera 116. For example, the matching search results may be of the form {(location: 40.7584° N, 73.9867° W), (age: adult), (full_body: black), (accessory: sunglasses, black), (time: 4:06 pm, today)}. The search results may be accompanied by a confidence score, for example, expressed as a percentage between 0% and 100%. Note that the search results may not include all features and descriptions of the search criteria; for example, the search results may match only a subset of the search criteria.

Next, dispatch assistant computer 122 formats, generates, or produces text corresponding to the search results. In particular, dispatch assistance computer 122 may convert the search results to natural language text using known techniques. Continuing the ongoing example, the text may be of the form, "Suspect in 10-24 seen in surveillance video at 234 Main Street at 4:06 pm. Suspect is an adult wearing all black clothing and black sunglasses." Note that dispatch assistant computer 122 may convert geographic coordinates to a street address using known techniques such as a web service prior to sending the text to speech generation component 208. According to some embodiments, the text may include a confidence score, for example, "Confidence in the accuracy of this match is 65%".

Next, dispatch assistant computer 122 sends the text to speech generation component 208. Speech generation component 208 generates digital audio corresponding to the provided text, in the ongoing example, "suspect in 10-24 seen in surveillance video at 234 Main Street at 4:06 pm. Suspect is an adult wearing all black clothing and black sunglasses. Confidence in the accuracy of this match is 65%."

Next, according to some embodiments, dispatch assistant computer 122 uses transmission interface 212 to operate base station 124 to deliver the digital audio as an alert sent out over the two-way radio system to one or more first responders in the field.

According to some embodiments, the alert is broadcast the digital audio over the two-way radio dispatch system to all first responders in the field. Continuing the ongoing example, nearby first responders 110 on foot and in vehicle 106 hear the broadcast, and proceed to the indicated location of suspect 128.

According to other embodiments, rather than broadcasting, dispatch assistant computer 122 uses transmission interface 212 to operate base station 124 to deliver the alert over the two-way radio dispatch system to a select group of first responders in the field. The select group may be determined through the use of geolocation module 218. In particular, geolocation module 218 stores realtime information as to the current locations of first responders. Dispatch assistant computer 122 may identify first responders that are near the location of suspect 128. For example, dispatch assistant computer 122 may identify all first responders on foot, for example, 110, within a half-mile distance threshold of the location of suspect 128 and all first responders in vehicles, for example, in vehicle 106, within a two mile distance threshold of the location of suspect 128. Note that these distances are for purposes of illustration rather than limitation. Dispatch assistant computer 122 then delivers the digital audio over the two-way radio dispatch system only to the first responders that are identified as being near to the location of suspect 128. Targeted two-way radio communication techniques may be used to that end, for example, CTCSS, DCS, a trunked radio system, or IP packet addressing.

According to some embodiments, for targeted delivery of the alert to only specific first responders, the computer generated audio may be delivered to one or more first responders' cell phones. For example, network interface 210 may be used to access a cellular network insertion point. Alternately, or in addition, text corresponding to the audio alert, for example, as provided to speech generation component 208, may be sent to one or more first responders' cell phones, for example, as text messages. As another example, the network interface be used to access a P25 communications network. Other targeted delivery techniques are possible in addition or in the alternative.

In the ongoing example, first responders 110 on foot and in vehicle 106 are both about a mile from the location of suspect 128. With the example distance thresholds above, dispatch assistant computer 122 may deliver the digital audio to the first responder in vehicle 106, but not to first responder 110 on foot.

Whether broadcast or delivered to a select first responder or responders, the alert may be delayed until a period of silence is present on the communication channel used by the two-way radio dispatch system, as shown and described above in reference to transmission interface 212 of FIG. 2.

Once the digital audio alert is sent over the two-way radio dispatch system, the example usage may conclude. First responders receiving the alert may act accordingly, for example, those in the vicinity of location identified in the alert may proceed thereto to address the issue of event 126.

Figure 3:
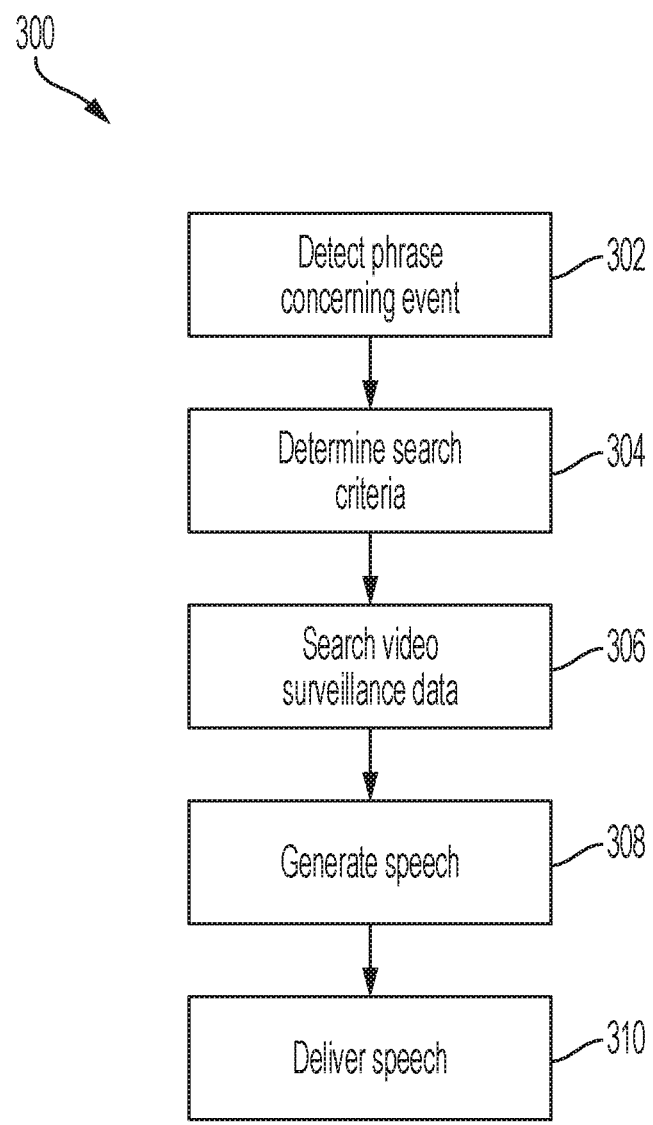
FIG. 3 is a flow chart diagram of a method for providing speech-based assistance in a two-way radio system according to some embodiments.

FIG. 3 is a schematic diagram of a method 300 for providing speech-based assistance in a two-way radio system according to some embodiments. Method 300 may be practiced using system 100, for example, outfitted with dispatch assistant computer 200 of FIG. 2 as an implementation of dispatch assistant computer 122. Prior to method 300, an event such as event 126 may have occurred, a first responder, such as dispatcher 104, may be have been contacted about the event, and a description of the event may have been broadcast or sent via targeted delivery over the two-way dispatch system as shown and described above in reference to FIG. 1.

At 302, dispatch assistant computer 122, interfacing with base station 124, may detect the description of the event sent out over the two-way radio dispatch system, for example, as described above in reference to FIGS. 1 and 2. As noted above, the detected natural language description of the event will typically include the geographic location of the event, such as a street address or the like.

At 304, dispatch assistant computer 122, for example, using natural language speech processor 206 as described above in reference to FIGS. 1 and 2, determines at least one search criteria from the natural language description of the event.

At 306, dispatch assistant computer 122, for example, by interfacing with video surveillance server 118 as shown and described above in reference to FIGS. 1 and 2, searches video surveillance data, for example, video surveillance metadata, using the search criteria generated per 304, to obtain search results. As noted above, the search results indicate that a camera(s) has captured still images or video images that include an object (for example, a person, a vehicle, etc.) having a description (for example, one or more descriptive characteristics) that matches at least some of the descriptive characteristics specified in the search criteria. In various implementations, the search results may include the geographic location of the camera(s) the captured the images.

At 308, dispatch assistant computer 122, for example, using speech generation component 208, forms computer generated speech corresponding to the search results obtained per 306, as shown and described above in reference to FIGS. 1 and 2. As noted above, the computer generated speech may include the geographic location of the camera(s) the captured the images, in order to direct the first responder to the location of the object of interest, such as the location of a person or vehicle that corresponds to the search criteria.

At 310, dispatch assistant computer 122, for example, by way of base station 124, delivers the computer generated speech over the two-way radio dispatch system as shown and described above in reference to FIGS. 1 and 2.

This may conclude method 300.

Many variations and alternative embodiments are possible. For example, some embodiments may include the ability to include in the computer-generated audio alert supplemental information about the event or a participant in the event. Such supplemental information may concern details of a suspect, if the suspect's identity and such details are known. According to such embodiments, natural language speech processor 206 may include a neural network or other trained machine learning classifier trained to recognize people's names. Such a classifier may have been trained by a training corpus that includes raw text strings paired with labels indicating whether such strings are names for people or not. In usage, as part of generating search criteria for searching video surveillance data, such embodiments may use any names extracted from the report by the trained classifier as supplemental search criteria. The supplemental search criteria may be used to search one or more law enforcement databases, for example, mugshots and/or a database of wanted individuals. Search results, such as most wanted posters, may be scraped for information concerning the suspect, and such information may be delivered as part of any alert sent out as a result of subsequently locating John Doe in video surveillance data.

For example, suspect John Doe may be identified as participating in an in-progress robbery in a broadcast sent out on the two-way radio dispatch system, for example, by a dispatcher. The classifier trained to identify peoples' names may be applied to the text corresponding to the report to obtain as a search result a most wanted poster for John Doe from a law enforcement database. Dispatch assistant computer 122, or another component or web service, may scrape the most wanted poster for relevant information. Such relevant information may include the phrase "wanted for murder". This phrase may be converted to computer-generated speech and included in any alert sent out in response to John Doe being identified in surveillance video according to the techniques disclosed herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method of notification, the method comprising:
   detecting a natural language phrase concerning an event at a geographic location in speech broadcast by a radio system;
   determining at least one search criteria from the natural language phrase;
   searching video surveillance data based on the at least one search criteria, whereby search results are obtained;
   forming computer generated speech: i) that corresponds to the search results; and ii) is based at least in part on a natural language description from video surveillance metadata for at least one matching video segment; and
   delivering the computer generated speech audibly.

2. The method of claim 1, wherein the at least one search criteria comprises an identification of the geographic location, and wherein the searching comprises:
   identifying, based on the identification of the geographic location, at least one video camera proximate to the geographic location; and
   searching video surveillance data from the at least one video camera proximate to the geographical location.

3. The method of claim 1, wherein the delivering comprises broadcasting the computer generated speech through the radio system.

4. The method of claim 3, wherein the delivering further comprises:
   waiting for a period of audio inactivity on the radio system; and
   commencing broadcasting the computer generated speech through the radio system during the period of audio inactivity.

5. The method of claim 1, wherein the delivering comprises:
   detecting at least one specific responder near to the geographic location; and
   delivering the computer generated speech audibly to the at least one specific responder.

6. The method of claim 5, wherein the delivering comprises delivering of the computer generated speech audibly to the at least one specific responder via a mobile phone of the at least one responder.

7. The method of claim 1, wherein the at least one search criteria comprises at least one of a physical description of a person or a physical description of a vehicle.

8. The method of claim 1, wherein the natural language phrase comprises an identification of a specific individual, the method further comprising retrieving information regarding the specific individual from a law enforcement database based on the identification, wherein the computer generated speech comprises at least some of the information regarding the individual.

9. The method of claim 1, wherein the determining the at least one search criteria from the natural language phrase comprises:
   converting the speech for the natural language phrase to a first text string of words;
   applying a synonym mapper to the first text string of words to obtain a second text string of words; and
   parsing the second text string of words to obtain the at least one search criteria.

10. A system for notification, the system comprising:
   at least one electronic processor configured to receive a natural language phrase concerning an event at a geographic location detected in speech broadcast by a radio system;
   at least one electronic processor configured to determine at least one search criteria from the natural language phrase;
   at least one electronic processor configured to request a search of video surveillance data based on the at least one search criteria, whereby search results are obtained;
   at least one electronic processor configured to obtain computer generated speech: i) that corresponds to the search results; and ii) is based at least in part on a natural language description from video surveillance metadata for at least one matching video segment; and
   at least one electronic processor configured to deliver the computer generated speech audibly.

11. The system of claim 10, wherein the at least one search criteria comprises an identification of the geographic location, and wherein the at least one electronic processor configured to request a search of video surveillance data is further configured to:
   identify, based on the identification of the geographic location, at least one video camera proximate to the geographic location; and
   request a search of video surveillance data from the at least one video camera proximate to the geographical location.

12. The system of claim 10, wherein the at least one electronic processor configured to deliver the computer generated speech audibly is further configured to broadcasting the computer generated speech through the radio system.

13. The system of claim 12, wherein the at least one electronic processor configured to deliver the computer generated speech audibly is further configured to:
   wait for a period of audio inactivity on the radio system; and
   commence broadcasting the computer generated speech through the radio system during the period of audio inactivity.

14. The system of claim 10, wherein the at least one electronic processor configured to deliver the computer generated speech audibly is further configured to:
   detect at least one specific responder near to the geographic location; and
   deliver the computer generated speech audibly to the at least one specific responder.

15. The system of claim 14, wherein the at least one electronic processor configured to deliver the computer generated speech audibly is further configured to deliver of the computer generated speech audibly to the at least one specific responder via a mobile phone of the at least one responder.

16. The system of claim 10, wherein the at least one search criteria comprises at least one of a physical description of a person or a physical description of a vehicle.

17. The system of claim 10, wherein the natural language phrase comprises an identification of a specific individual, the system further comprising at least one electronic processor configured to retrieve information regarding the specific individual from a law enforcement database based on the identification, wherein the computer generated speech comprises at least some of the information regarding the individual.

18. The system of claim 10, wherein the at least one electronic processor configured to determine at least one search criteria from the natural language phrase is further configured to:
   convert the speech for the natural language phrase to a first text string of words;
   apply a synonym mapper to the first text string of words to obtain a second text string of words; and
   parse the second text string of words to obtain the at least one search criteria.

* * * * *